United States Patent [19]
Nower et al.

[11] Patent Number: 5,684,578
[45] Date of Patent: Nov. 4, 1997

[54] LASER ALIGNMENT HEAD FOR USE IN SHAFT ALIGNMENT

[75] Inventors: Daniel L. Nower; David Q. Gaddis, both of Knoxville, Tenn.

[73] Assignee: Computational Systems, Inc., Knoxville, Tenn.

[21] Appl. No.: 264,703

[22] Filed: Jun. 23, 1994

[51] Int. Cl.⁶ .................. G01B 11/26; G01C 1/00; G01C 15/00
[52] U.S. Cl. .................. 356/141.3; 356/153; 33/286
[58] Field of Search .................. 356/141.3, 152.1, 356/153, 139.04, 400, 139.09; 33/286, 645; 250/214 B

[56] References Cited

U.S. PATENT DOCUMENTS

| | | | |
|---|---|---|---|
| 2,833,051 | 5/1958 | Cunningham | 33/180 |
| 3,192,631 | 7/1965 | Goguen et al. | 33/46 |
| 3,525,158 | 8/1970 | Torlay | 33/180 |
| 3,631,604 | 1/1972 | Schenaver | 33/180 |
| 3,664,029 | 5/1972 | Glucoft et al. | 33/180 |
| 3,733,706 | 5/1973 | Blohm | 33/180 |
| 3,901,604 | 8/1975 | Butler | 356/139.09 |
| 3,902,810 | 9/1975 | Hamar | 356/158 |
| 3,962,796 | 6/1976 | Johnston | 33/288 |
| 4,118,871 | 10/1978 | Kirkham | 33/174 |
| 4,130,941 | 12/1978 | Amsbury | 33/174 |
| 4,148,013 | 4/1979 | Finn et al. | 340/189 |
| 4,216,587 | 8/1980 | Stone | 33/180 |
| 4,244,111 | 1/1981 | Heard, Sr. | 33/180 |
| 4,274,735 | 6/1981 | Tamura et al. | 356/3.06 |
| 4,328,623 | 5/1982 | Juengel et al. | 33/174 |
| 4,367,594 | 1/1983 | Murray, Jr. | 33/181 |

(List continued on next page.)

FOREIGN PATENT DOCUMENTS

| 1017140 | 9/1977 | Canada | 33/65 |
|---|---|---|---|

OTHER PUBLICATIONS

Bolam, J. R., *Coupling Alignment: the Reverse Indicator Method Simplified*, Jul./Aug. 1990, P/PM Technology pp. 16–23.
Piotrowski, J., *Shaft Alignment Handbook*, Copyright 1986, pp. 85–86.
Murray Jr., M., *Alignment Manual for Horizontal Flexibly Coupled Rotating Machines*, 3rd Edition Copyright 1983, p. 31.
Dodd, V. R., *Total Alignment*, Copyright 1974, pp., II-2, II-3, II-4.
Dodd, V. R., *Total Alignment*, Copyright 1974, pp. I-5, II-6, II-7.
Durkin, Tom, *Aligning Shafts*, Jan. 11, 1979, Plant Engineering, pp. 86–90.
Durkin, Tom, *Aligning Shafts*, Feb. 8, 1979, Plant Engineering, pp. 102–105.
Product Feature Section, *A Patterned Capacitance Absolute Displacement Sensor*, Aug. 1992, Sensors, pp. 50–51.

*Primary Examiner*—Thomas H. Tarcza
*Assistant Examiner*—Pinchus M. Laufer
*Attorney, Agent, or Firm*—Luedeka Neely & Graham P.C.

[57] ABSTRACT

The specification discloses a laser alignment head system for taking alignment data with respect to a pair of coupled shafts. Each alignment head includes a laser, a laser sensor for sensing a laser beam, an angle sensor for sensing the rotational orientation of the laser head, a computer and a transmitter for transmitting data from the laser head. The two laser heads are mounted on the two shafts in an opposing facing relationship with the laser beam of one head disposed on the laser sensor of the other head. As the shafts are rotated, the laser beam moves on the laser sensor and the laser sensor generates a position signal corresponding to such movement. Likewise, the angle sensor produces an angle signal corresponding to the rotational angle of the laser head as the shafts are rotated. The computer produces output data corresponding to the position signal and the rotational angle, and such data is transmitted to a receiver. An analyzer is interfaced with the receiver to receive the data and calculate misalignment information.

21 Claims, 8 Drawing Sheets

U.S. PATENT DOCUMENTS

| | | | |
|---|---|---|---|
| 4,428,126 | 1/1984 | Banks | 33/412 |
| 4,451,992 | 6/1984 | Malak | 33/412 |
| 4,463,438 | 7/1984 | Zatezalo et al. | 364/715 |
| 4,516,328 | 5/1985 | Massey | 33/181 |
| 4,518,855 | 5/1985 | Malak | 356/141.3 |
| 4,534,114 | 8/1985 | Woyton et al. | 33/181 |
| 4,553,335 | 11/1985 | Woyton | 33/181 |
| 4,586,264 | 5/1986 | Zatezalo | 33/412 |
| 4,623,979 | 11/1986 | Zatezalo et al. | 364/715 |
| 4,709,485 | 12/1987 | Bowman | 33/228 |
| 4,761,749 | 8/1988 | Titsworth et al. | 364/559 |
| 4,764,010 | 8/1988 | Bachmann et al. | 356/153 |
| 4,928,401 | 5/1990 | Murray | 33/645 |
| 4,931,964 | 6/1990 | Titsworth et al. | 364/559 |
| 4,964,224 | 10/1990 | Jackson | 33/645 |
| 4,977,516 | 12/1990 | Shepherd | 364/508 |
| 4,984,173 | 1/1991 | Imam et al. | 364/508 |
| 5,026,998 | 6/1991 | Holzl | 250/561 |
| 5,056,233 | 10/1991 | Hechel et al. | 33/288 |
| 5,056,237 | 10/1991 | Saunders | 33/645 |
| 5,077,905 | 1/1992 | Murray | 33/412 |
| 5,115,406 | 5/1992 | Zatezalo et al. | 364/551.01 |
| 5,148,232 | 9/1992 | Duey et al. | 356/152 |
| 5,185,937 | 2/1993 | Piety et al. | 33/645 |
| 5,231,768 | 8/1993 | Beckwith, Jr. | 33/567 |
| 5,353,111 | 10/1994 | Freese et al. | 356/152.1 |

LASER ALIGNMENT HEAD FOR USE IN SHAFT ALIGNMENT

FIELD OF THE INVENTION

This invention relates to the field of shaft alignment and particularly to the field of laser alignment heads for the alignment of mated shafts.

BACKGROUND OF THE INVENTION

Mated shaft alignment is a critical maintenance problem in a variety of machinery operations. For example, an electric motor may drive an output shaft which will then be mated through a coupling to drive a pump. Such shafts are typically coupled through a somewhat flexible coupling to compensate for minor misalignment. However, even minor alignment errors result in a loss of power through the coupling, increase bearing wear in the bearings supporting the shafts, and shorten life span of the coupling.

In the past, a variety of mechanical shaft alignment schemes have been developed in order to determine whether shaft alignment falls within specifications. Additionally, such schemes typically include some type of assistance to provide information on what type of adjustment of the mated machines is necessary to achieve optimal alignment. Mechanical shaft alignment techniques traditionally use elongate rods connected to the two shafts by some types of shaft coupler. Through the use of these rods, the horizontal and vertical misalignment of the shafts may be determined. However, because of the weight of the elongate rods and positioning and sensing limitations, error is introduced in the measurements. In fact, much of the recent development in the shaft alignment art has concentrated on eliminating or minimizing sag in the rods or compensating therefore. Thus, even though current advances have allowed for increased accuracy of such mechanical alignment techniques, the advances themselves result in problems.

One such problem is that the compensation for the limitations of the elongate rods results in increased workload based on carrying out the error correcting techniques. Further, since such techniques add additional steps to the process of measuring shaft alignment, they inherently introduce the possibility of further error being introduced into the measurement.

One advance has been to replace the elongated rods with laser beams. Lasers beams can effectively simulate rods of effectively infinite length with no sag. In most prior art laser alignment systems, the laser beam merely replaces the rod and the system remains otherwise the same. However, while the use of laser beams has the potential of providing additional data, new functions, error resistance, and ease of use, it also presents multiple new problems in detecting the laser beam and transmitting the data.

Therefore, it is an object of the present invention to provide a shaft alignment system for the quick, easy and accurate alignment of mated shafts.

It is a further object of the present invention to provide a shaft alignment system utilizing two laser beams.

It is yet a further object of the present invention to provide an automated shaft alignment system using laser alignment heads and telemetry to simplify data collecting in the alignment of mated shafts.

SUMMARY OF THE INVENTION

The above and further features are present in a laser alignment head system made in accordance with a preferred embodiment of the present invention, in which a pair of laser alignment heads are provided with a mounting bracket for securing the heads on opposite sides of a coupling which couples mated shafts. In this embodiment each head is provided with a laser and a position sensor for sensing the positions of the laser beam emanating from the other head.

In addition, each laser head is provided with an angle sensor to detect the head orientation with respect to the horizontal. The position sensor output and angle sensor output are provided to a microprocessor present in each head which determines a laser position value and an angle value. These values are output from the processor which is then used to calculate the misalignment of the mated shafts and machine moves necessary to properly align the shafts.

In the preferred embodiment of the present invention a wireless communication system is provided to output the position value and the angle value to an alignment analyzer. The communications system preferably includes a head module present on each head and an analyzer module present on the analyzer. The head module includes a communications processor which receives the position and angle values from the head microprocessor and converts them to a code suitable for communication. This code is then transmitted by infrared LEDs. Also included in the head module are infrared detectors which detect infrared transmissions from the analyzer module. The communications processor is further able the de-code the transmissions received by the detector and transmit the information to the head processor. While the preferred embodiment uses infrared wireless communication, it is understood that other wireless systems, such as radio frequency, could be used.

In this embodiment, the analyzer module has a communications processor which encodes information from the analyzer to be sent to the heads. Similarly, the communications processor also de-codes transmissions received from the heads and provides the information to the analyzer. Infrared LEDs are controlled by the communications processor to transmit outgoing signals and infrared detectors are provided to detect incoming transmissions from the heads.

In one embodiment, the transmitting LED's and infrared detectors are preferably provided in both the analyzer module and a separate remote module. The separate remote module is connected by cable to the analyzer which is connected to the analyzer by a cable. The detectors and transmitters of both the analyzer module and the remote module operate together so that both heads may communicate with both modules. Thus, for example, if a head loses communication with the analyzer module, but continues to communicate with the separate remote module, then communication between the head and analyzer is maintained. Except for the functionality provided by the cables, this embodiment functions identically to the previously described infrared LED's and detectors.

While wireless communication systems are highly desirable for a laser alignment head system, it will be appreciated that a practical wireless communication system is relatively slow compared to typical communication systems utilizing wire or cable connections. It is also highly desirable to use a pulsed laser system in the preferred embodiment, but a practical wireless communication system is generally not desirable for controlling the pulsed lasers.

In the preferred embodiment, however, these problems are overcome by using master and slave alignment heads. These heads are constructed as previously described with each head including a computer, a pulsed laser, a laser position sensor, an angle position sensor, a communications device, and a power supply. The computer receives a position signal and an angle signal from the position sensor and angle sensor, respectively, and produces data for transmission to the communication device, substantially as previously described. In addition, the computer for the slave head analyzes the position signal to determine when the master laser is turned on and off and synchronizes the pulses of the laser of the slave head with the pulses of the laser of the master head. The computers of both the master and the slave heads sample the position signals when the lasers are turned on and determines ambient light conditions (intensity) when the lasers are turned off.

Once the lasers are synchronized, they are independently precisely controlled as to frequency so that they remain substantially synchronized throughout the process of obtaining alignment data. Thus, it is not necessary to continuously resynchronize the pulsed lasers of the master and slave heads. However, to insure accuracy, the computer of the slave head is preferably programmed to perform resynchronization at predetermined time intervals, such as once per second. The length of time between synchronization and resynchronization would be determined by the precision and stability of the pulse frequency.

In the preferred embodiment, the computer for each head stores and uses calibration data. In particular, calibration data is stored in the computer for the particular angle sensor and particular position sensor that is used on the head. Thus, the calibration data stored in each head is unique to that particular head, and the data generated by each head is corrected using the calibration data. Thus, it is not necessary to use matched pairs of master and slave heads and it is not necessary to use an analyzer that is matched with any particular head.

Another important feature of the preferred embodiment is the ability of the computer and each head to store historical data. As the shafts are rotated, each head continuously produces angle data and corresponding position data and, preferably, that data is immediately transmitted to the analyzer where it is displayed for the user in almost real time. However, the computers of each head are also programmed to store historical data at predetermined angular intervals, such as every ten degrees. Each item of historical data includes an angle and a position of the laser at such angle. After the historical data has been acquired, it is transferred to the analyzer, preferably upon command by the analyzer.

BRIEF DESCRIPTION OF THE DRAWINGS

The present invention may best be understood by reference to the following Detailed Description of a preferred embodiment with reference to the accompanying Drawings in which.

DETAILED DESCRIPTION OF A PREFERRED EMBODIMENT

Figure 1:
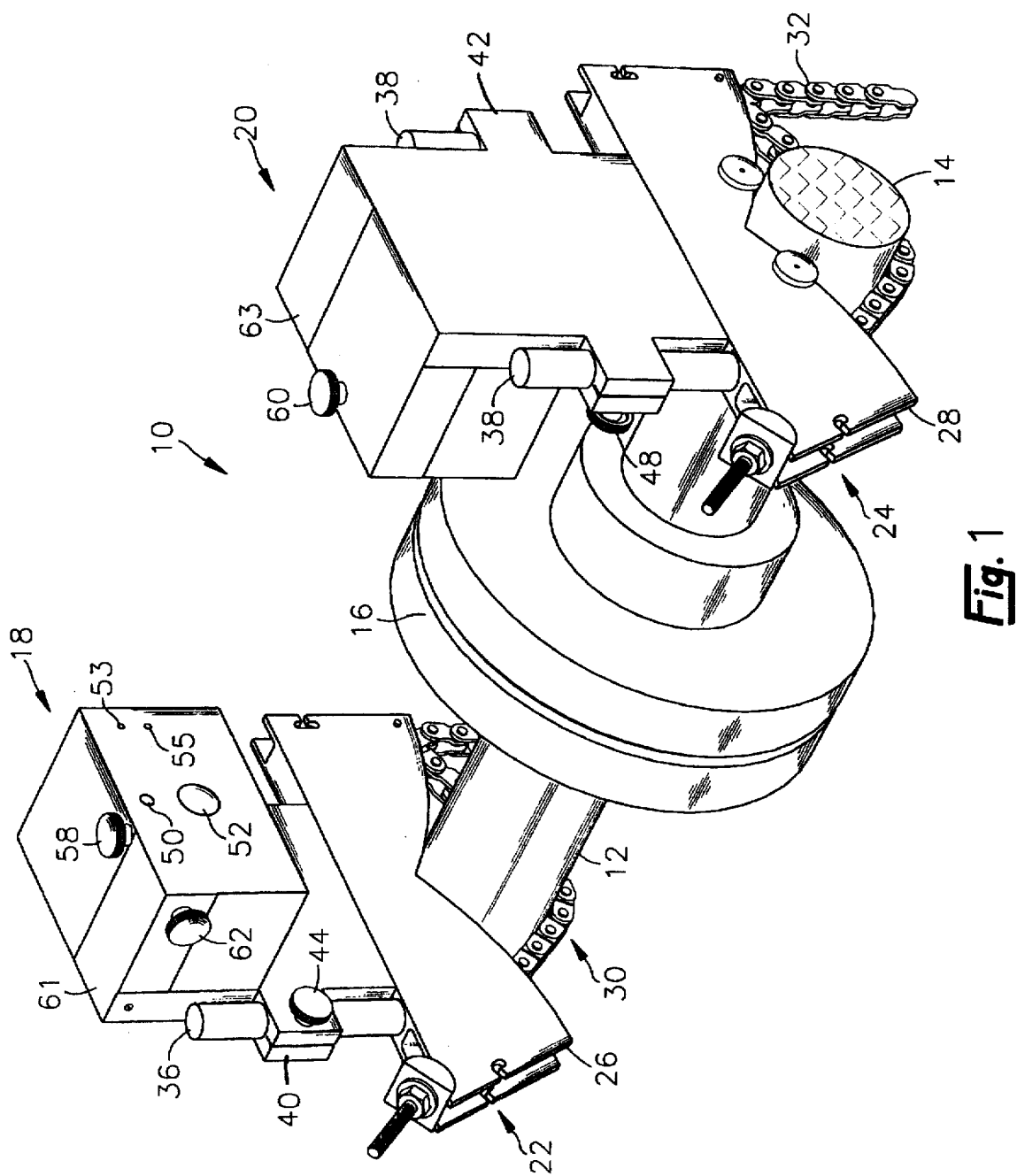
FIG. 1 is a perspective view of a shaft alignment system using laser alignment heads.

Referring now to the Figures in which like reference numerals indicate like or corresponding features, there is shown in FIG. 1 a shaft alignment system 10 using laser alignment heads 18 and 20. A complete description of a mounting system for use in the mechanical alignment of coupled shafts is disclosed in co-pending application entitled "Mechanical Shaft Alignment", filed May 25, 1993, by Daniel L. Nower et al., application Ser. No. 08/066,728, which is hereby incorporated by reference. This reference fully describes the type of mounting s which is shown in FIG. 1 and how are taken The present laser alignment system 10, utilizes laser alignment heads 18 and 20 in place of the mechanical measurement system described in the above referenced application, but otherwise the heads of the two systems are mounted similarly on the shafts. As was described in the above referenced application, the basic information to be gathered in a shaft alignment system is the amount of displacement or movement that occurs between a projection coaxial to one shaft and the other shaft, as the shafts are rotated through various degrees of rotation.

Then, based upon calculation methods well known in the art, shaft misalignment may be calculated. Once the misalignment has been calculated, further known methods may be used to calculate the horizontal machine moves (horizontal movements of the feet of one or both of the machines) or the vertical machine moves (placement of shims underneath the feet of the machines) necessary to bring the shafts back into alignment.

With reference again to FIG. 1, there is shown the laser alignment system 10. The system 10 is mounted on first and second machinery shafts 12, 14 which are coupled to each other by means of a coupling 16. The shafts 12, 14 are connected to respective machines (not shown) such as a motor driving a pump through the coupling 16. A first laser alignment head 18 (hereinafter head 18) and a second laser alignment head 20 (hereinafter head 20) are mounted on the shafts 12, 14.

Figure 2:
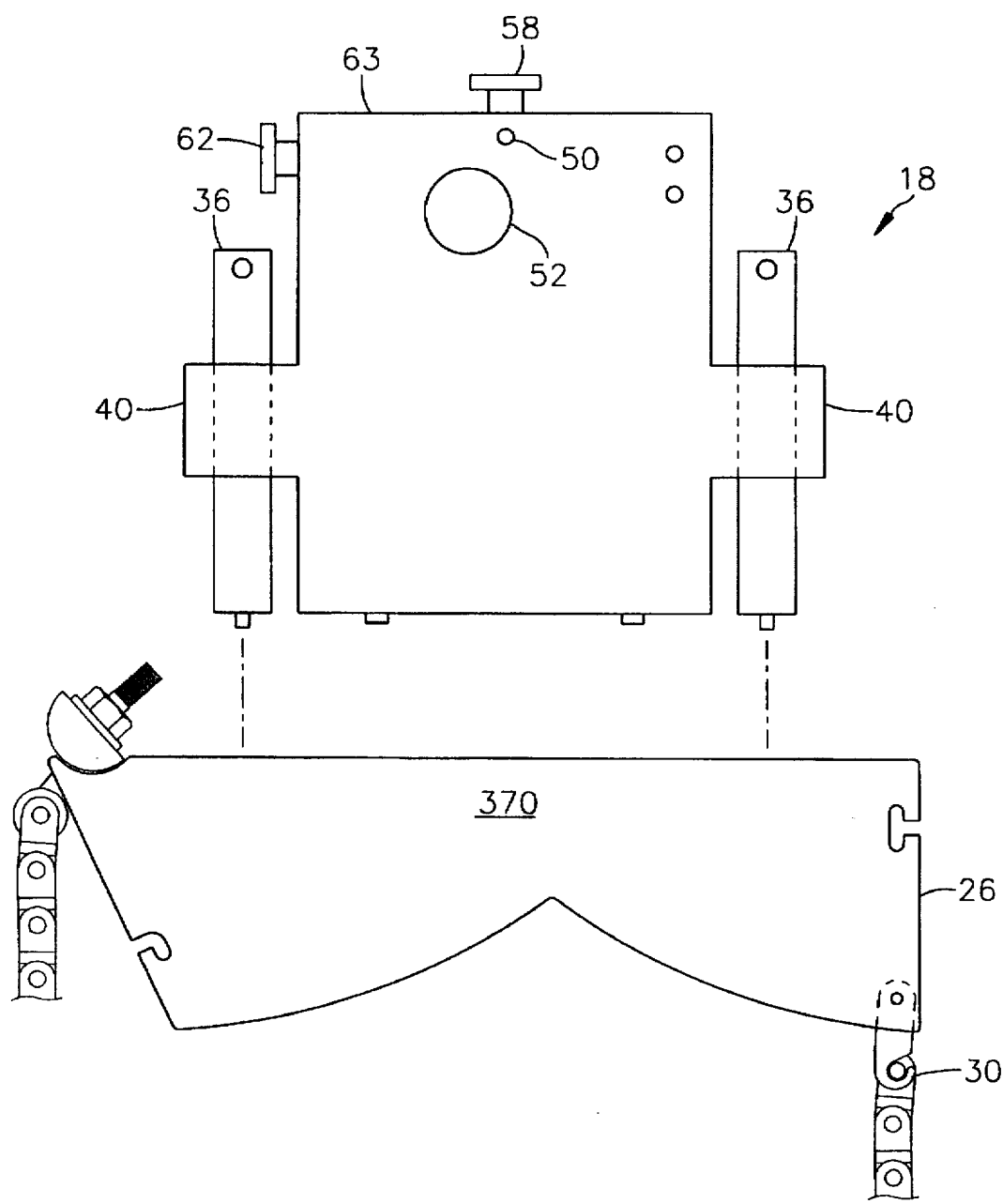
FIG. 2 is a somewhat diagrammatical, exploded, front view of a laser alignment head and a mounting bracket for securing the head to a shaft.

The heads 18, 20 are provided on mounting systems 22, 24 which are described in detail in the above referenced application. The mounting systems 22, 24 include bases 26, 28 and a chain assemblies 30, 32. Referring now to FIGS. 1 and 2, a shaft mounting system as described in the above referenced application is shown in connection with a laser alignment head 18, mounted on a base 26.

The chain assemblies 30, 32 are identical to those described in the above referenced application and provide a means to secure the bases 26, 28 to the shafts 12, 14. Round dowels 36, 38 are attached to the base 26, 28 for attachment of the heads 18, 20. The heads 18, 20 include split clamps 40, 42 which fit over the dowels 36, 38. Clamp screws 44, 48 are provided on the split clamps 40, 42 to allow the clamps to be tightened on the dowels 36, 38. Thus, the height of the heads 18, 20 may be adjusted relative to the bases 26, 28 so that they are of approximate equal height.

The heads 18, 20 include a laser aperture 50 (not shown on head 20 due to perspective) through which a low power laser beam is emitted. Further, the heads 18, 20 include a sensor window 52 (not shown on head 20 due to perspective) through which the laser beam emitted by the opposing head is received. The sensor window 52 provides a window by which the laser beam may strike a photosensitive position detector which will be described more fully hereinafter. LED 53 is on when the head 18 is turned on and LED 55 indicates activation of the laser beam.

Provided on the heads 18, 20 are vertical aiming screws 58, 60 which allow small vertical adjustments of the aim of the lasers through the laser aperture 50 and the laser aperture on head 20 which is not shown. Further, as is shown on head 18, a horizontal aiming screw 62 is provided on each head 18, 20 (not shown on head 20 due to perspective). Like the vertical aiming screws 58, 60 the horizontal aiming screw 62 allows for small horizontal adjustments of the aim of the laser beams. The adjustment screws 58, 60, 62 (and the one not shown) allow the laser beams emanating from the heads 18, 20 to be aimed so as to fall on the sensor window 52 on each head 18, 20. Typically, the heads 18, 20 will be positioned at generally the same height above the shafts 12, 14 by sliding the head 18, 20 along the dowels 36, 38 to a desired position and then tightening the split clamp screws 44, 48. The aiming of the laser beams is then fine tuned using the aiming screws 58, 60, 62 and the one not shown. Preferably, the perimeter of the sensor window 52 is visible or marked on the laser heads 18, 20 so that one may aim the beams merely by observing laser radiation on the head housings 61, and 63.

Figure 3:
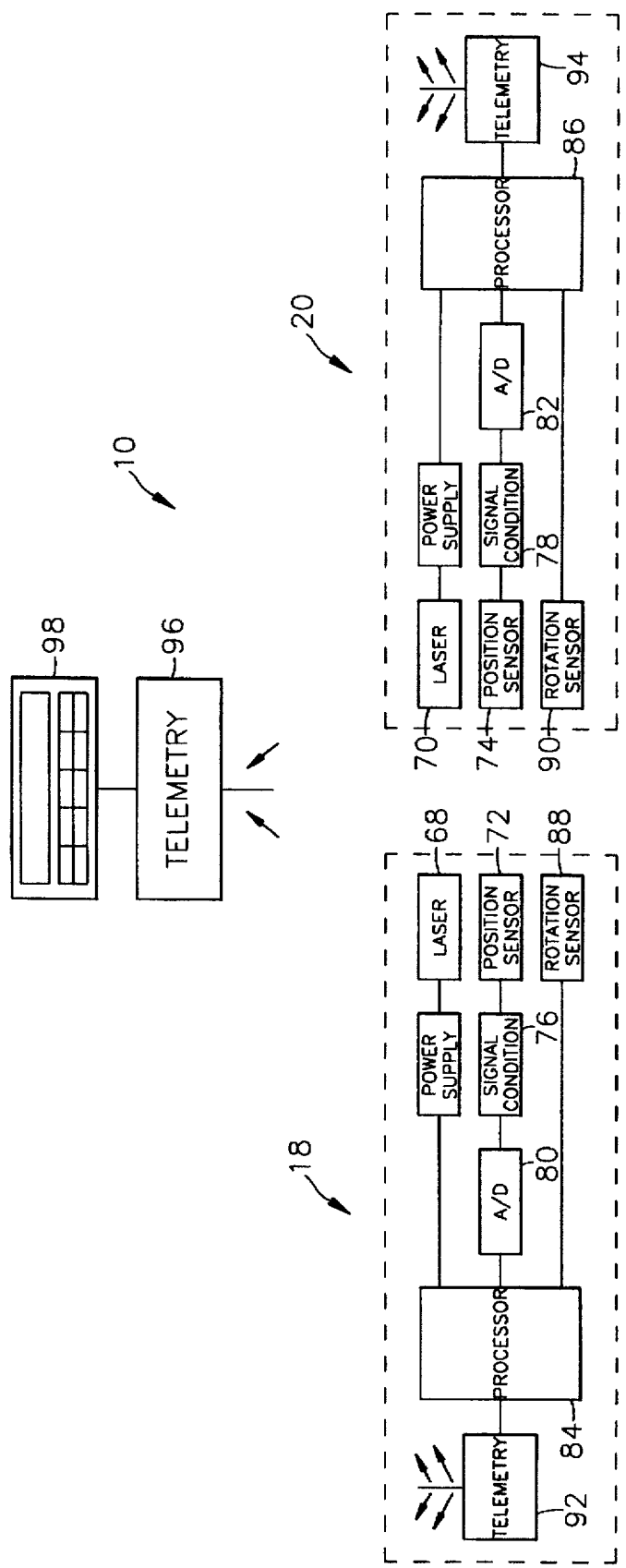
FIG. 3 is a block diagram illustrating the electronics and communications circuitry of the laser heads and alignment analyzer.

Referring now to FIG. 3, a block diagram showing the electronic components of the laser alignment system is shown. Lasers 68, 70 generate the laser beams which emanate from each head 18, 20 (FIG. 1). Position sensors 72, 74 sense the X and Y coordinates of the laser beam striking each sensor 72, 74 and generate a currents corresponding to the coordinates. Signal conditioners 76, 78 then convert the current to voltage and track and hold the voltages so that they can be provided to other components of the system 10. Finally, the voltage values are digitized by analog to digital converters 80, 82 and the digital position values are provided to processors 84, 86.

Power supplies 88, 90 provide power to the lasers 68, 70. The power supplies 88, 90 may either be operated in a continuous mode by having a switch mounted on the exterior of the heads 18, 20 which a user turns on or may be selectively controlled by the processors 84, 86 (as shown in FIG. 3) only when desired. When controlled by the processors 84, 86, the lasers 68, 70 can be turned on only when data needs to be taken, thus minimizing power usage. Preferably, the lasers 68 and 70 are pulsed at 220 Hertz.

Additional data is generated by the rotational position sensors 88, 90. These sensors 88, 90 determine the angular position of the heads 18, 20. As described in the above referenced application, the rotational position of the heads 18, 20 (typically 0°, 90°, 180° and 270°) must be known in addition to the change in position of the laser beam for each positional measurement. The rotational position sensors 88, 90 generate signals corresponding to the rotational orientation of the heads and these signals are provided to the processors 84, 86.

The processors then process the X,Y position information and the rotational position information, typically using calibration values stored on board and storing the values in temporary memory and then provide the processed data to telemetry units 92, 94. These units then transmit the data to a further telemetry unit 96 which provides the data to a shaft alignment analyzer 98 such as the ULTRASPEC (TM) 8000 shaft alignment analyzer manufactured by Computational Systems, Inc., Knoxville, Tenn. The analyzer 98 receives the data, calculates the amount of misalignment in the shaft based on the data and determines how the feet of the machines need to be adjusted in order to achieve optimal shaft alignment.

The analyzer 98 represents input ports and a computer, which is programmed to calculate misalignment (offset and angularity) based on provided input, plus a keyboard and display. In a typical conventional alignment calculator, input (e.g. angle and displacement) is provided through a keyboard. In contrast, analyzer 98 receives the same or similar input automatically through an input port. The analyzer 98 is programmed with an automatic mode to automatically acquire data as the shafts 12 and 14 are slowly rotated and is further programmed with manual mode to acquire data when the user instructs using the keyboard. The user selects either the automatic or manual mode of data acquisition.

Preferably, the telemetry to and from the analyzer 98 and heads 18 and 20 is accomplished utilizing infrared transmissions over relatively short distances. However, if desired for longer distance telemetry, a radio frequency system may be substituted. Further, although the wireless communication of the disclosed telemetry units makes data gathering easier since there are no wires to get tangled when the shafts or heads are rotated, a wire may be used in place of the telemetry units to transfer data from the heads 18, 20 to the analyzer 98.

One problem with the use of an infrared telemetry system is speed. Typical practical infrared telemetry systems are not sufficiently fast in the transmission of information to control the operation of the pulsed lasers in addition to transmitting data and other information as required. Thus, in the preferred embodiment, master and slave heads are used in part to overcome this problem. Referring to FIG. 3, for example, head 18 may be regarded as master head 18 which works in conjunction with slave head 20. In this example, all of the components of master head 18 will be referred to as master components, such as master laser 68 and the components of slave head 20 will be regarded as slave components, although this terminology is not meant to imply that all of the components of slave head 20 are actually slaved to another component.

One purpose of having a master and slave heads is to achieve synchronization of the pulsed lasers 68 and 70. It is desirable to monitor the position of the laser beams of lasers 68 and 70 when the lasers are on. It is also desirable to measure the ambient light conditions when the lasers 68 and 70 are off. Thus, it is necessary for the master head 18 to "know" when the slave laser 70 is off and on. Likewise, it is necessary for the slave head 20 to "know" when the master laser 68 is on and off. One potential solution would be to transmit by telemetry the status of each laser 68 and 70 to the processors 86 and 84, respectively. However, practical telemetry systems are generally too slow and unreliable to accomplish this function in a satisfactory manner.

Another solution would be for the slave processor 86 and the master processor 84 to constantly monitor the signals from the position sensors 72 and 74 and analyze the wave form to determine the presence or absence of a pulsed laser and, if present, to determine when the laser is on and off. This technique is not preferred, however, because it requires that a significant amount of processor time be devoted to analyzing the wave form from the position sensors 72 and 74.

In the preferred embodiment, a synchronization technique is used. The slave processor 86 monitors the position signal generated by the position sensor 74 as transmitted through the signal conditioning circuit 78 and the analog to digital convertor 82. When the slave processor 86 is first turned on, it immediately begins to analyze the position signal from position sensor 74 looking for a large positive slope ($\Delta V/\Delta t$) where V is a voltage representing the overall amplitude of the signal generated by the position sensor, which corresponds to the overall intensity detected by the sensor 74 and "t" is time. The ideal pulsed laser 68 and position sensor 74 would produce a square wave and the leading edge of a pulse would be represented by an infinite positive slope. Of course, however, there is a rise time associated with any pulsed laser, such as laser 68, and any position sensor, such as sensor 74. Thus, the slope will not be infinite, but it will be sufficiently large that it is easily recognized by observing $\Delta V/\Delta t$ in determining the presence of the leading edge when $\Delta V/\Delta t$ exceeds a predetermined threshold. Such threshold would vary depending upon the laser, detector and amplification electronics used. In the preferred embodiment, the voltage changes signs (negative to positive) when the pulse appears, and changes signs again at the trailing edge of the pulse. Thus, it is preferred to detect the leading edge of the pulse by observing the sign change, and, in effect, the preferred embodiment is detecting the pulse by comparing V to a threshold.

Likewise, the presence or absence of pulses in the position signal generated by sensor 74 may be detected by detecting the trailing edge of a pulse. In the case of an ideal square wave, the trailing edge of the pulse would have a slope of negative infinity. Again, however, there are ramp down times associated with laser 68, the position sensor 74 and even the signal conditioning circuit 78. However, again, the trailing edge of the pulse produced by the position sensor 74 will have a very high negative slope and in absolute numbers it will typically be greater than the slope associated with the leading edge of the pulse. Thus, the leading and trailing edges of the pulse may be located by monitoring $\Delta V/\Delta t$. Once either the leading or trailing edge of the pulse is detected, the on and off times of the laser 68 may be accurately predicted because laser 68 is precisely pulsed at a frequency of 220 hertz and such frequency is precisely controlled using crystal timing circuits that are well known.

In the preferred embodiment, the slave processor 86 starts the pulsed laser 70 upon the detection of the leading edge of a pulse from position sensor 74. The pulse frequency of laser 70 is precisely controlled to be 220 hertz by conventional crystal timing circuitry. Thus, once the slave processor 86 detects the leading edge of a pulse from master laser 68, it starts the slave laser 70 at precisely the same frequency as the master laser 68 and the processor 86 "knows" that the two lasers will pulse on and off at the same time for at least a predetermined period of time thereafter.

It will be recognized that some time is required to detect the leading edge of a pulse from laser 68 and for the processor to start laser 70. Thus, slave laser 70 is slightly out of phase and behind master laser 68. However, for practical purposes, this phase shift is not significant and the lasers will be considered to be synchronized. If this slight phase shift were considered important in any application, the processor 86 could detect a leading edge of a pulse from laser 68 and then start the laser 70 at precisely the predicted time of the next pulse from laser 68 taking into consideration the time lag associated with detecting the leading edge. By using such technique, the slight phase lag of laser 70 could be eliminated, or laser 70 could be turned on to lead or lag the phase of laser 68 by a predetermined time.

After processor 86 has synchronized laser 70 with laser 68, it monitors the signal from the position sensor 74 in accordance with the timing signals to laser 70. When laser 70 is turned on, it assumes that laser 68 is on and monitors the position sensor 74 in the middle of the laser pulse to determine the position of the laser beam. When laser 70 is off, it assumes that laser 68 is off and processor 86 monitors position sensor 74 to determine the overall ambient light condition.

The processor 84 of the master head 86 always assumes that the slave laser 70 is on and off synchronously with the master laser 68. Thus, processor 84 monitors the position sensor 72 for ambient light conditions when laser 68 is off and monitors the sensor 72 for the position of a laser beam from slave laser 70 when master laser 68 is on. The ambient light condition is considered background noise and is mathematically removed by the processors 84 and 86 when the processor 86 is monitoring the presence and position of the laser beam from laser 68 on position sensor 74.

When slave head 20 is first turned on, it begins to look for a leading edge of a pulse from master laser 68 and continues to look for such leading edge for a predetermined period of time, preferably about one sample period (1/220 second). If no leading edge is detected, the slave laser 20 will start laser 70 and free run as if it were a master head for a predetermined time, preferably about 44 sample periods (1/5 second). Thereafter, the slave head 20 will attempt to detect the leading edge of a pulsed laser beam at position sensor 74 every 1/5 second and it will continue to free run until such master laser beam is detected. When the master laser beam is finally detected, the processor 86 will synchronize laser 70 in the manner described above and will resynchronize or attempt to resynchronize the laser 70 after a predetermined time which is chosen depending upon the predicted drift between the frequency of slave laser 70 as compared to master laser 68. The amount of drift would, of course, vary with the particular electronic implementation and the conditions under which the heads 18 and 20 are operated. However, in the preferred embodiment, the slave laser 70 is resynchronized every 220 samples (every second), which is much more often than necessary to maintain synchronization. During a resynchronization attempt, the laser 70 continues to run at the pulse frequency according to the previous synchronization. If the resynchronization attempt is unsuccessful, the laser 70 continues to run in accordance with the previous successful synchronization. Again, one could synchronize using either the leading or trailing edges.

Another important feature of the laser heads 18 and 20 is the automatic history mode that is programmed into the processors 84 and 86. When the process of obtaining data is started and the heads 18 and 20 begin to rotate, the two heads 18 and 20 constantly transmit current position and angle data back to the analyzer 98 in accordance with the position and angle signals produced by the position sensors 72 and 74 and the rotation sensors 88 and 90. The current data is displayed in almost real time, there being slight delays in acquiring, processing and transmitting the data. In addition, the processors 84 and 86 are acquiring and storing data in accordance with the automatic history mode. In such mode, the heads 18 and 20 automatically attempt to obtain and store historical data at predetermined positions. For example, the heads 18 and 20 are preferably programmed to obtain data at every 10 degree increments as the heads are rotated through 360 degrees. When a head is within two degrees of a trigger point (such as a 10 degree position), it begins to acquire data in the form of an angle and an x-y position of the laser beam. Thus, the historical data may be acquired anywhere between 9 and 11 degrees, 19 and 21 degrees, etc. As the heads 18 and 20 are rotated, the historical data is stored by the processors 84 and 86 in onboard memory which is represented in FIG. 3 by the blocks 84 and 94. At the end of rotation (or at any other selected or predetermined time), the analyzer 98 commands each head 18 and 20 to communicate its historical data to the analyzer 98. Either the historical data or the current data could be used by the analyzer 98 to determine the alignment of the two shafts 12 and 14, but it is preferred to use the historical data. Since the calibration data is stored in each of the heads 18 and 20, the heads 18 and 20 calibrate both the historical data and the current data. Thus, the storage of the calibration on the heads 18 and 20 enables to heads to operate independently of the analyzer 98 to acquire and store calibrated data. Because of the historical data mode, it is not necessary for the analyzer 98 to remain in telecommunication with the heads 18 and 20 while data is being acquired. Preferably, the analyzer 98 is programmed to automatically download the historical data from the heads 18 and 20 at preset time intervals or after a predetermined rotation and also includes a manual mode in which the user may manually recommend such download.

Another feature of the invention that improves reliability is the use of multiple samples to generate a reading. In the preferred embodiment, the user through the analyzer 98 may program each of the heads 18 and 20 to use a selected number of samples to produce each reading. Preferably, the user may select a multiple of 11 samples (11, 22, 33, 44, etc.) up to a maximum of 220 samples per reading. The default or preferred number of samples per reading is 44 which requires ⅕ second to acquire a reading. The multiple samples are averaged to obtain a reading, and the averaging will tend to average out noise. For example, if the readings are being taken in the presence of vibration, the lasers 68 and 70 and the position sensor 72 and 74 will vibrate and, thus, the laser beams striking the position sensors 72 and 74 will appear to vibrate. However, by averaging 44 samples, the averaging process will effectively remove the error introduced by typical vibration.

Another desirable feature of the invention relates to the physical positioning and interpretation of the sensors 72, 74, 88 and 90. The position sensors 72 and 74 are identical, one to the other, and are positioned identically in the heads 18 and 20. Likewise, rotation sensors 88 and 90 are identical, one to the other, and are placed in the heads 18 and 20 in precisely the same physical orientation. However, when the heads 18 and 20 are used, they are placed in a facing orientation and, thus, the heads are facing in opposite directions which means that the x direction of the position sensors 72 and 74 are oriented in linearly opposite directions. Likewise, the rotational sensors 88 and 90 are oriented in rotationally opposite directions and, when the heads 18 and 20 are rotated, the sensors 88 and 90 will report rotation in opposite directions. That is, if rotation sensor 88 produces a signal indicating rotation from 0 to 10 degrees, then rotation sensor 90 will produce a signal indicating rotation from zero to 350 degrees. Likewise, movement in a positive x direction on position sensor 74 will indicate movement in the negative x direction of position sensor 72. Rather than attempt to physically correct this opposite orientation, slave processor 86 is programmed to correct the signals received from sensors 74 and 90. To correct the data received from position sensor 74, it is necessary only to change the sign of the signal (negative to positive or positive to negative) on the x axis. To correct the signal from rotation sensor 90, the angle indicated by rotation sensor 90 is subtracted from 360 degrees. Thus, when rotation sensor 90 indicates 359 degrees, processor 86 will convert it to one degree, when sensor 90 indicates 358 degrees processor 86 will convert it to 2 degrees, etc. Providing for orientation correction by processor 86 allows one to physically produce heads 18 and 20 identically with identical parts identically positioned in the heads 18 and 20. By eliminating the need for different parts or different manufacturing techniques between the heads, manufacturing is made simpler, less expensive and more reliable.

Figure 4:
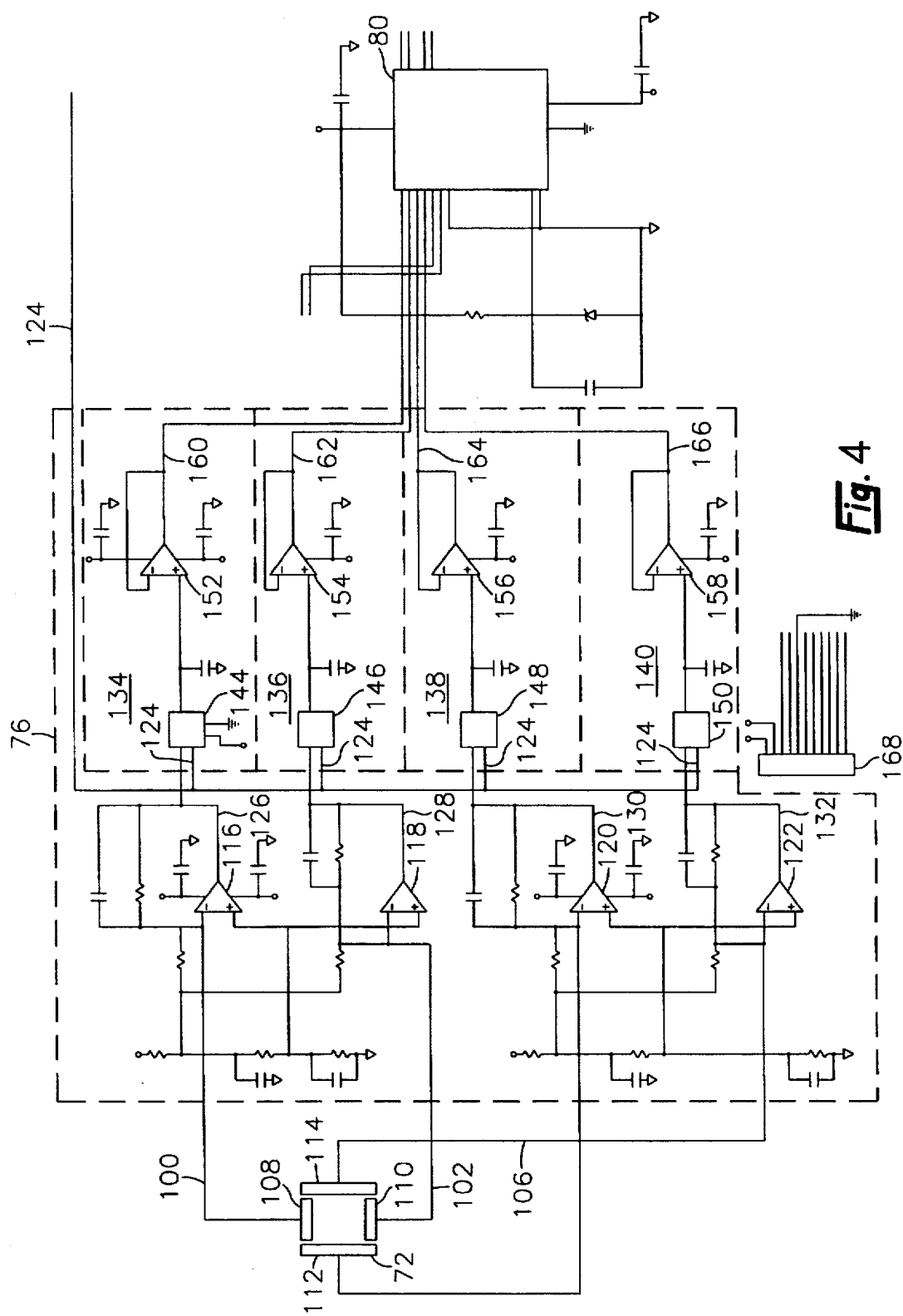
FIG. 4 is a more detailed circuit diagram illustrating a position sensor of the laser heads and associated conditioning electronics and analog to digital converter.

Referring now to FIGS. 4-8, the previously described components of the system will be described in detail with reference to detailed circuit diagrams. For the sake of clarity, the circuitry associated with only a single laser head will be shown; it should be understood that there would be two laser heads in use in the system, but the circuitry would be identical in each. There is shown in FIG. 4 a circuit diagram for the position sensor 72, conditioning electronics 76, and analog to digital converter (ADC) 80.

The position sensor 72 is a dual axis PSD sensor such as that made by UDT, of California (Model No. DL10). Depending upon where the laser beam strikes the sensor 72, a varying current will be generated on lines 100, 102, 104, and 106 from anodes 108, 110 and cathodes 112, 114. The dual axis design provides both X and Y coordinates for the position of the laser beam which provides additional data.

The currents on lines 100, 102, 104 and 106 are provided to operational amplifiers 116, 118, 120 and 122. The operational amplifiers 116, 118, 120, and 122 are configured as current to voltage converters and output a voltage corresponding to the current on lines 126, 128, 130 and 132. The outputs of the op-amps 116, 118, 120 and are then provided to track and hold circuits 134, 136, 138 and 140. The track and hold circuits track the voltages output on lines 126, 128, 130 and 132 and holds the voltages for sampling by the ADC 80. The track and hold circuits 134, 136, 138 and 140 each consist of a bilateral switch 144, 146, 148 and 150 and an operational amplifier 152, 154, 156, 158. In operation, the voltage on lines 126, 128, 130 and 132 is tracked until an a sample signal is received over line 124. At that time, the voltage level present on those lines 126, 128, 130, and 132 is held and provided as the output on lines 160, 162, 164 and 166. These lines provide input to the ADC 80 which is preferably a 12 bit analog to digital converter. The output of the ADC 80 is provided to jumper 168 which connects the circuitry of FIG. 4 to the circuitry of FIG. 5. Jumper 168 also provides the sample signal on line 124, power and various control signals from the circuitry of FIG. 5.

Figure 5:
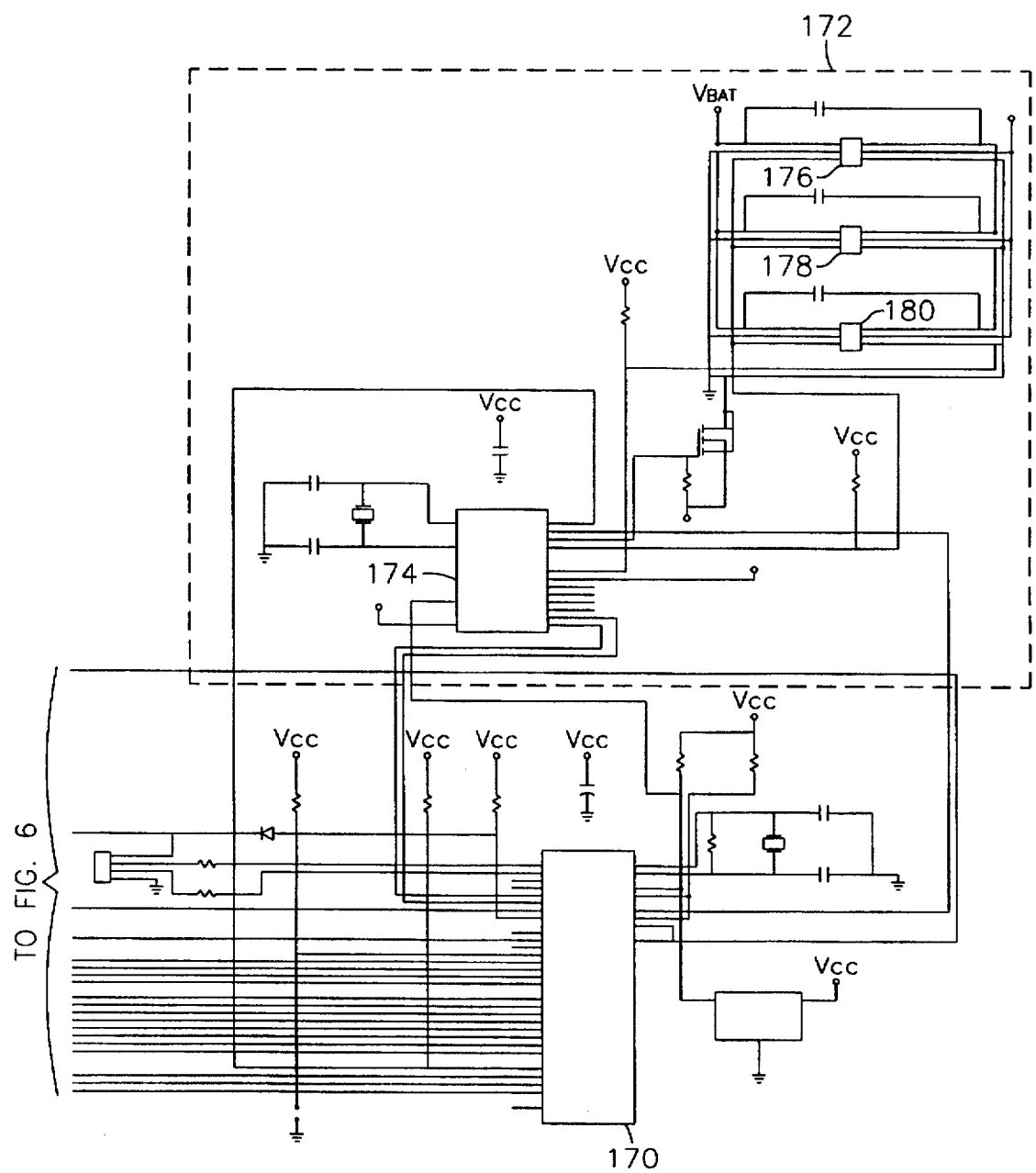
FIGS. 5 and 6 constitute a more detailed circuit diagram illustrating a processor and communications control for a laser head.
Figure 6:
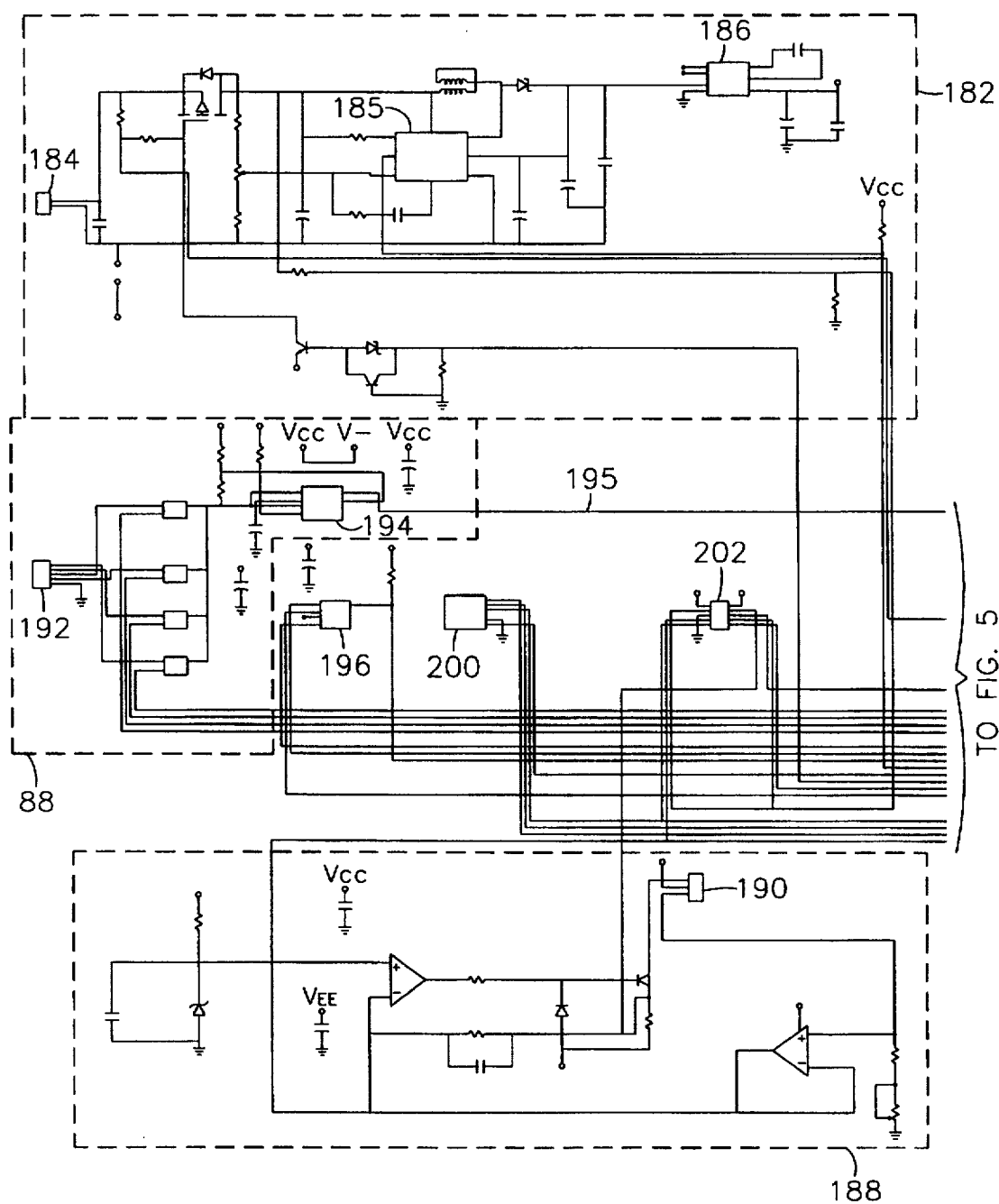

Referring now to FIGS. 5 and 6, there is shown the processor and communications control for the laser head 18. A microprocessor 170 (corresponding to processors 84 and 86 of FIG. 3) for control of the laser head 18 operations is preferably a MC68HC705C8FN 8-bit microprocessor, available from Motorola. The communications controller circuitry 172, controls the data link between the laser head 18 (FIG. 3) and the analyzer 98 (FIG. 3). As was briefly mentioned earlier, the preferred data link is infrared wireless telemetry. The communications of laser heads 18, 20 is controlled by the circuitry 172. The primary communications control is provided by an 8-bit microprocessor 174 such as a PIC16C54/P available from Microchip. Outgoing and incoming communications from the laser head 18 are provided through jumpers 176, 178 and 180 to 3 infrared LED's and detectors which are described in detail in FIG. 7.

As indicated in FIG. 5, the lines terminating on the left edge of the figure continue on the right side of FIG. 6. Referring now to FIG. 6 remaining features of the electronics of the laser head may be described. The power supply 182 is provided by a 3 cell NiCad battery producing between about 3.2–4.2 V DC. This voltage is provided through jumper 184 to voltage regulators 185, 186 to provide positive and negative rails of $V_{cc}$. Also shown is the laser diode power supply 188. This circuit provides power to a 670 nm diode laser through jumper 190. A preferred laser diode is the TOLD 9211, available from Toshiba.

The angle sensor 88 (also referred to as the rotational position sensor) preferably includes a Lucus Angle Sensor known as Ortho Ranger (TM) available from Lucas Schaevitz, Pennsauken, N.J. The angle sensor 88 is centered around a liquid capacitance sensor 192 and associated circuitry. The liquid capacitor has four cells. As the laser head 18 is rotated, the capacitance varies and changes a pulse width of a signal generated by signal generator 194 on line 195. Before using the laser head, the angle sensor 88 must be calibrated; i.e., the pulse width generated by the generator 194 on line 195 must be determined for a variety of known angles. This information (calibration coefficients) is then stored in EPROM 196 for future access by the microprocessor 170. In use, the microprocessor 170 samples the pulse width on line 198 and then determines the angular orientation of the head 18 with reference to the coefficients stored in the EPROM 196.

A Random Access Memory (RAM) 200 is provided for intermediate data storage for the microprocessor 170. Whenever the microprocessor 170 is making calculations, data may be stored in RAM 200 until such calculations are complete. Jumper 202 connects the microprocessor board of FIGS. 5 and 6 to the jumper 168 of the position sensor board of FIG. 4.

Figure 7:
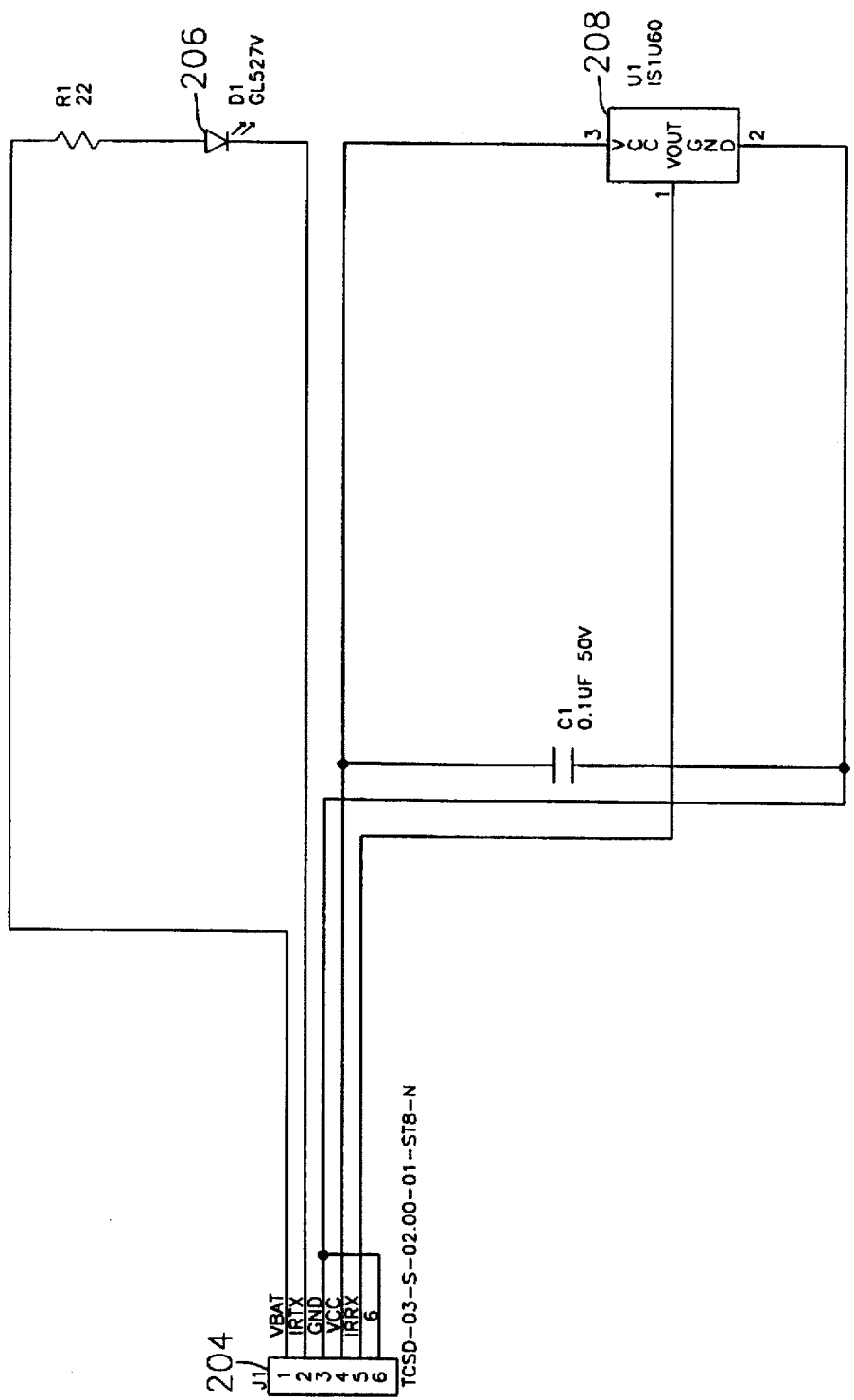
FIG. 7 is a circuit diagram of an infrared emitter and detector constituting an infrared transceiver used by the laser heads.

Three identical boards, one of which is shown in FIG. 7, are connected to jumpers 176, 178 and 180 of FIG. 5 (previously mentioned). Each board comprises an infrared transceiver for the laser head side of the wireless communications link. The IR transceivers each consist of a jumper 204 which is connected to one of the jumpers 176, 178 or 180. An infrared LED 206 is provided for transmission of data from the head 18 and an infrared detector 208 is provided for receipt of communications from the analyzer.

Figure 8:
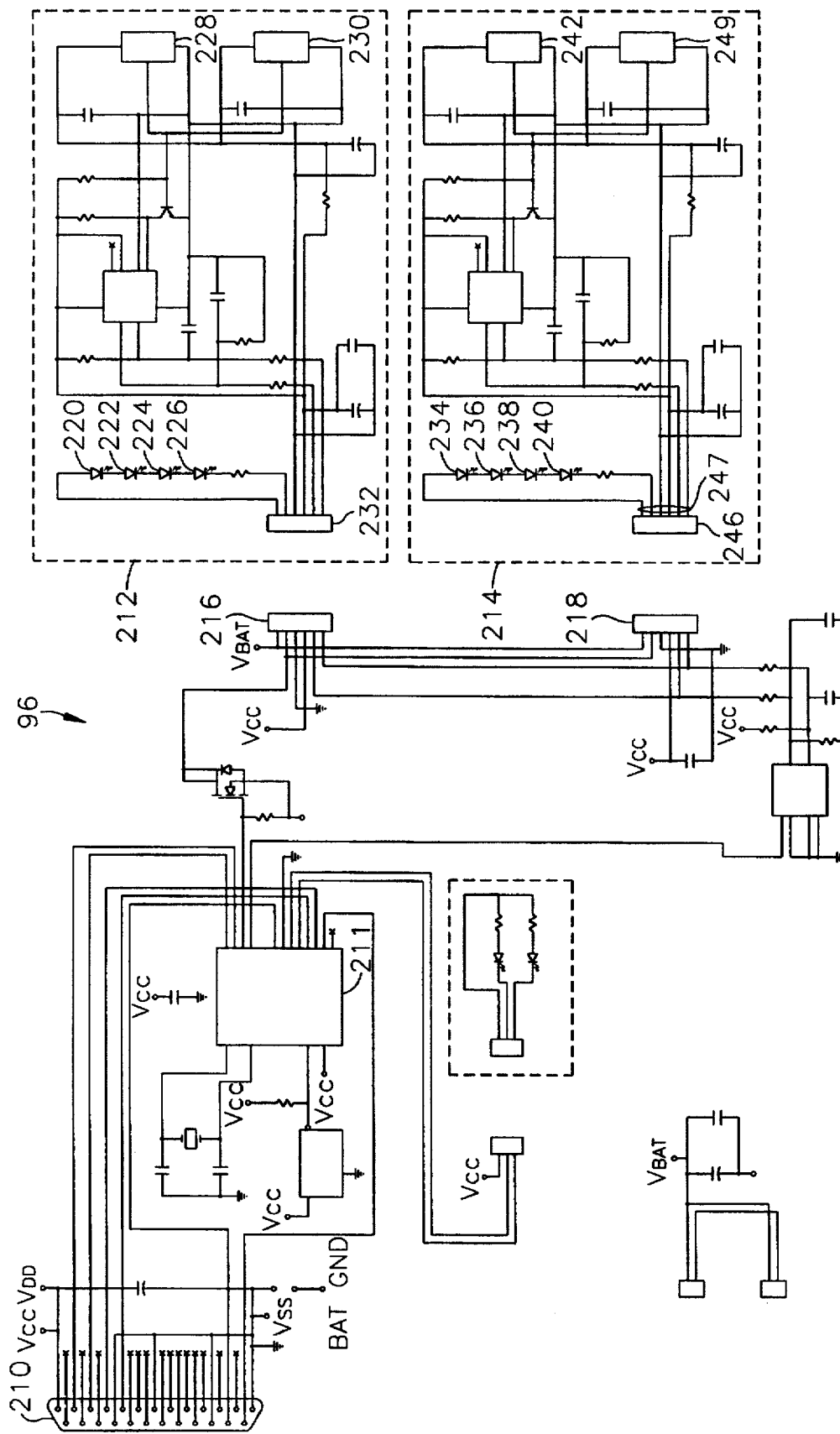
FIG. 8 is a circuit diagram illustrating two infrared transceivers, and associated adapter electronics for interfacing the transceivers with the alignment analyzer.

The final component of the system is the infrared transceiver 96 which provides the infrared telemetry to and from the analyzer 98. Referring now to FIG. 8, the infrared transceiver 96 consists of a small box having an output connector 210 which connects to an input port of the analyzer 98. The communications features are controlled by an 8-bit microprocessor 211 such as the PIC16C54/P previously described with respect to FIG. 5. Data is carried to and from two transceivers 212, 214 through jumpers 216, 218. Internal transceiver 212 transmits through four infrared LED's 220, 222, 224 and 226 and receives through two infrared detectors 228 and 230. The received data or data to be transmitted is transmitted through jumper 232 and jumper 216.

An external infrared transceiver 214 is also provided. This transceiver 214 is identical in function and construction to the internal transceiver 212. It transmits through four LEDs 234, 236, 238 and 240 and receives through two infrared detectors 242 and 244. Data is communicated to and from the microprocessor 211 through jumper 246 and jumper 218. When both transceivers 212, 214 are connected to microprocessor 211, both transceivers are used to attempt communication. The difference between the internal transceiver 212 and external transceiver 214 is that the internal transceiver 212 is provided in the same housing as the microprocessor 211 which is attached directly to the analyzer 98. In some situations, it is not convenient to hold the analyzer 98 close to the laser heads 18, 20 during data collection or there is no convenient place to put the analyzer. The external transceiver 214 is contained in a small housing and is connected to the telemetry unit 96 through a relatively long (eg. 10 feet) cable represented schematically by lines 247. Thus, the external transceiver 214 may be placed close to the laser heads 18, 20 for better reception. Also, the external transceiver 214 may be placed near head 20, and the internal transceiver 212 may be placed near head 18, for example. In such case, the heads 18 and 20 may communicate through the nearest transceiver 212, 214 even though the heads 18 and 20 have lost communication with the furthest transceiver 212, 214.

Various methods of coding and transmission of the data are well known in the art and may be used. In the preferred embodiment, a "non return to zero" coding method is used with the infrared communications. As was previously discussed, infrared is not the only type of wireless communication system which will work. A RF (radio frequency) system could easily be substituted for the infrared system. Further, even a wire or cable may be used to transmit data from the laser heads to the analyzer.

One major benefit of the above described system is the automation of the data collecting process. Typically, mechanical shaft alignment units are first set up and a reading taken with the unit at 0 degrees. Then the shaft or the unit is rotated to 90 degrees and a further reading is taken. This procedure is repeated at 180 degrees and 270 degrees to generate sufficient data for the amount of misalignment to be calculated. The present laser heads, used with the ULTRA SPEC (TM) 8000 alignment analyzer, allow for the automated taking of data. No reading of split rings or displacement meters is required. All that is required of a user of the laser heads is to rotate the shafts as prompted by the analyzer; data collection and analysis is automatic. Alternatively, the user may push a button to indicate when the data should be taken.

Furthermore, the wireless communication features allow for ease of transmission of data to the analyzer. Since there are no wires to tangle when the shaft is rotated, the wireless feature makes the taking of data much simpler.

We claim:

1. A laser alignment head system for takers multiple position alignment data with respect to two coupled shafts comprising:

two laser alignment heads each of said alignment heads comprising:
a laser generating a laser beam;
a laser sensor for sensing a laser beam and generating a position signal corresponding to the position of the laser beam on said sensor;
an angle sensor for sensing the rotational orientation of said laser head and generating an angle signal corresponding to the rotational orientation of said laser head;
a head circuit for receiving said position signal and angle signal and outputting data corresponding to the position and angle signal;
a wireless transmitter for transmitting said data generated by said head circuit;
a power supply providing a power signal to at least said laser sensor, said angle sensor, said head circuit, said transmitter and said laser; and two shaft mounting brackets for securing said laser alignment heads to the shafts;

a wireless receiver means for receiving said data from said transmitter; and an analyzer for receiving data from said receiver and determining offset and angularity between the two shafts based on data corresponding to the position and angle signals at multiple angular positions of said heads about the shaft axis.

2. The system of claim 1 further comprising:
said head circuit including a processor;
non-volatile memory associated with said processor for non-volatile storage of at least instructions for said processor and calibration data for said processor to use in generating said data from said position and angle signals; and
random access memory associated with said processor.

3. The system of claim 1 further comprising:
said head circuit including a digital processor;
said wireless transmitter further comprising a receiver;
wherein said wireless transmitter and said receiver comprise a transceiver;
said transceiver including:
   a communications processor for receiving said data from said processor and for converting said data into driving signals for transmissions and converting a received signal into input for said processor;
   at least one infrared light emitting diode connected to said communications processor so that said light emitting diode is turned on and off in accordance with said driving signals; and
   at least one infrared detector connected to said communications processor, said detector generating a received signal corresponding to detected infrared emissions.

4. The system of claim 1 wherein said head circuit further comprises a processor and memory for automatically storing historical data at a plurality of angular positions, said historical data including a plurality of historical data pairs, each pair comprising an angle corresponding to the angle signal and a position corresponding to the position signal.

5. The system of claim 1, wherein said laser sensor further comprises an x-y sensor generating x and y coordinates corresponding to the position at which the laser beam is striking said x-y sensor.

6. The system of claim 1 wherein said angle sensor further comprises a liquid capacitance sensor circuit generating a signal having characteristics corresponding to the rotational orientation of the sensor.

7. The system of claim 1 further comprising an analyzer connected to the receiver, receiving said data from said receiver, and analyzing said data to determine misalignment of said shafts.

8. The system of claim 1 wherein said heads rotate about a stationary shaft.

9. The system of claim 1 wherein said shaft rotates and said heads remain fixed to said shaft.

10. A laser alignment head system for taking multiple position alignment data with respect to two coupled shafts comprising:
two laser alignment heads each of Said alignment heads comprising:
   a laser generating a laser beam;
   a laser sensor for sensing a laser beam and generating a position signal corresponding to the position of the laser beam on said sensor;
   an angle sensor for sensing the rotational orientation of said laser head and generating an angle signal corresponding to the rotational orientation of said laser head;
   a head circuit for receiving said position signal and angle signal and outputting data corresponding to the position and angle signal;
   a wireless transmitter for transmitting said data generated by said head circuit;
   a power supply providing a power signal to at least said laser sensor, said angle sensor, said head circuit, said transmitter and said laser; and
two shaft mounting brackets for rotatably securing said laser alignment heads to the shafts;
a wireless receiver means for receiving said data from said transmitter, said receiver comprising:
   a receiver housing containing electronic circuitry for operating on said data;
   a cable extending from said receiver housing and connected to said electronic circuitry; and
   an external sensing unit connected to the cable on the end opposite from the receiver housing for receiving data from the transmitter and transmitting said data through said cable to said electronic circuitry in said receiver housing.

11. The system of claim 10 wherein said receiver further comprises an internal sensing unit disposed within said receiver housing for receiving data from the transmitter and supplying said data to said circuitry.

12. A laser alignment head system for being mounted on first and second substantially co-axial rotatable shafts for determining alignment information as to the first and second shafts as said shafts are rotated through a plurality of rotational orientations, comprising:
a master alignment head mounted on the first shaft and a slave alignment head mounted on the second shaft;
mounting brackets for mounting said master and slave alignment heads on the first and second shafts in a facing relationship;
said master alignment head and slave alignment head each comprising:
   a computer for controlling the operation of the alignment head and for receiving, transmitting and storing data;
   a pulsed laser for producing a pulsed laser beam at a pulse frequency with each pulse continuing for a pulse duration;
   a laser position sensor for sensing the position of the laser beam on said position sensor in a direction radial to the shafts and producing a position signal corresponding to the position of the laser beam;
   an angle sensor disposed in the alignment head for sensing the rotational orientation of the alignment head as said head is rotated on the shafts and producing an angle signal corresponding to the rotational orientation of the shafts;
   a communications device for transmitting and receiving information to and from said alignment head;
   said computer for receiving said position signal and said angle signal, for producing position data and angle data based on said position signal and angle signal, and for transmitting data corresponding to the position data and angle data to said communications device; and
   a power supply for supplying power to said computer, pulsed laser, laser position sensor, angle sensor, and communications device;
said computer of said slave alignment head for analyzing the position signal to determine when said laser of said master alignment head is turned on and for substantially synchronizing the pulses of said laser of said slave alignment head with the pulses of said laser of said master alignment head at said pulse frequency; and said computers of said master and slave alignment heads for sampling said position signals when said lasers of said master and slave alignment heads are turned on to produce "on" samples, for producing said position data based on said samples.

13. The system of claim 12 further comprising said computers of said master and slave alignment heads for sampling said position signals when said lasers are turned off to produce "off" samples and for determining the intensity of ambient light for each alignment head based on said "off" samples.

14. The system of claim 12 wherein each of said computers produces a plurality of readings, each reading being an average of a plurality of samples of said position and angle signals, and produces said calibrated position data based on said readings and said calibration data.

15. The system of claim 12 wherein said position sensor further comprises a sensor for detecting position of said laser beam in x and y directions and for generating a position signal having x and y components corresponding to the x and y directions, the y direction being radial with respect to the shafts and the x direction being perpendicular to the y direction and parallel to a tangent of the shafts.

16. The system of claim 15 wherein:

the x direction of said position sensor of said slave alignment head is disposed in a reverse linear orientation with respect to the x direction of said position sensor of said master alignment head and wherein said angle sensor of said slave alignment head is disposed in a reverse rotational orientation and is rotated in a reverse rotational direction as compared to said angle sensor of said master alignment head; and said computers for said master and slave alignment heads correct the position and angle data to correct for the reverse linear orientation and reverse rotational orientation.

17. The system of claim 12 further comprising said computers storing predetermined calibration data and for producing calibrated position data and calibrated angle data based on said position and angle signals and the calibration data.

18. The system of claim 12 further comprising said computers of said master and slave alignment heads for storing historical data corresponding to the angle data and the position data at a plurality of angular orientations of the shafts and for transmitting the historical data to said communications device after the historical data is produced and stored.

19. A laser alignment head for being mounted on one of first and second rotatable shafts for use in determining alignment information as to the first and second shafts as said shafts are rotated through a plurality of rotational orientations, comprising:

a computer for controlling the operation of the alignment head and for receiving, transmitting and storing data;

a pulsed laser for producing a pulsed laser beam at a pulse frequency with each pulse continuing for a pulse duration;

a laser position sensor for sensing the position of the laser beam on said position sensor in a direction radial to the shafts and producing a position signal corresponding to the position of the laser beam;

an angle sensor disposed in the alignment head for sensing the rotational orientation of the alignment head as the head is rotated on the shafts and producing an angle signal corresponding to the rotational orientation of the shafts;

a communications device for transmitting and receiving information to and from said alignment head;

said computer for receiving said position signal and said angle signal, for producing position data and angle data based on said position-signal and angle signal, for storing historical data corresponding to the angle data and the position data at a plurality of angular orientations of the shafts, and for transmitting the historical data to said communications device after said historical data is produced and stored;

a power supply for supplying power to said computer, pulsed laser, laser position sensor, angle sensor, and communications device; and mounting brackets for mounting the alignment head on one of the first and second shafts.

20. A laser alignment head for being mounted on one of first and second rotatable shafts for use in determining alignment information as to the first and second shafts as said shafts are rotated through a plurality of rotational orientations, comprising:

a computer for controlling the operation of the alignment head, for receiving, transmitting and storing data, and for storing predetermined calibration data;

a pulsed laser for producing a pulsed laser beam at a pulse frequency with each pulse continuing for a pulse duration;

a laser position sensor for sensing the position of the laser beam on said position sensor in a direction radial to the shafts and producing a position signal corresponding to the position of the laser beam;

an angle sensor disposed in the alignment head for sensing the rotational orientation of the alignment head as said head is rotated on the shafts and producing an angle signal corresponding to the rotational orientation of the shafts;

a wireless communications device for transmitting and receiving information to and from said alignment head;

said computer for receiving said position signal and said angle signal, for producing calibrated position data and calibrated angle data based on said position signal, angle signal and calibration data, and for transmitting the calibrated position data and calibrated angle data to said communications device;

a power supply for supplying power to said computer, pulsed laser, laser position sensor, angle sensor, and communications device;

mounting brackets for mounting the alignment head on one of the first and second shafts; and an analyzer for receiving data from said computer and determining offset and angle based on data from multiple angular positions of heads about the shaft axis.

21. A laser alignment head system for being mounted on first and second substantially co-axial rotatable shafts for determining alignment information as to the first and second shafts as said shafts are rotated through a plurality of rotational orientations, comprising:

a master alignment head mounted on the first shaft and a slave alignment head mounted on the second shaft;

said master and slave alignment heads each comprising:

a computer for controlling the operation of the alignment head, for receiving, transmitting and storing data, and for storing predetermined calibration data;

a pulsed laser for producing a pulsed laser beam at a pulse frequency with each pulse continuing for a pulse duration;

a laser position sensor for sensing the position of the laser beam on said position sensor in x and y directions and for generating a position signal having x and y components corresponding to the position of the laser beam in the x and y directions, the y direction being radial with respect to the shafts and the x direction being perpendicular to the y direction and parallel to a tangent of the shafts;

an angle sensor disposed in the alignment head for sensing the rotational orientation of the alignment head as said head is rotated on the shafts and producing an angle signal corresponding to the rotational orientation of the shafts;

a communications device for transmitting and receiving information to and from said alignment head;

said computer for receiving said position signal and said angle signal, for producing calibrated position data and calibrated angle data based on said position signal, angle signal and calibration data, for storing historical data corresponding to the calibrated angle data and the calibrated position data at a plurality of rotational orientations of the shafts, for transmitting current data corresponding to the calibrated position data and calibrated angle data substantially as it is produced to said communications device, for transmitting historical data to said communications device after said historical data is produced and stored; and a power supply for supplying power to said computer, pulsed laser, laser position sensor, angle sensor and communications device;

mounting brackets for mounting said master and slave alignment heads on the first and second shafts in a facing relationship such that the x direction of said position sensor of said slave alignment head is disposed in a reverse linear orientation with respect to the x direction of said position sensor of said master alignment head and such that said angle sensor of said slave alignment head is in a reverse rotational orientation and is rotated in a reverse rotational direction as compared to said angle sensor of said master alignment head;

said computers for said master and slave alignment heads for correcting the position and angle signals to correct for the reverse linear orientation and reverse rotational orientation;

said computer of said slave alignment head for analyzing the position signal to determine when said master laser is turned on and for substantially synchronizing the pulses of said laser of said slave alignment head with the pulses of said laser of said master alignment head at said pulse frequency;

said computers of said master and slave alignment heads for sampling said position signals when said lasers of said master and slave alignment heads are turned on and are substantially in the middle of the pulse duration to produce "on" samples, for producing said calibrated position data based on said "on" samples and said calibration data, and for sampling said position signals when said lasers are turned off to produce "off" samples and for determining ambient light conditions for each, alignment head based on said "off" samples;

said master and slave computers for producing a plurality of readings, each reading being an average of at least a plurality of samples of the position signal, and for producing said calibrated position data based on said readings and said calibration data; and an analyzer for receiving data from said computer and determining offset and angle based on data corresponding to position and angle signals at multiple angular positions of said heads about the shaft axis.

* * * * *